United States Patent
Chan et al.

(10) Patent No.: US 10,423,292 B2
(45) Date of Patent: Sep. 24, 2019

(54) MANAGING MESSAGES IN VEHICLES

(71) Applicant: Google LLC, Mountain View, CA (US)

(72) Inventors: Victor Chan, Mountain View, CA (US); Joseph Pieter Stefanus van Grieken, San Francisco, CA (US); Anthony Jesse Chen, San Francisco, CA (US)

(73) Assignee: Google LLC, Mountain View, CA (US)

( * ) Notice: Subject to any disclaimer, the term of this patent is extended or adjusted under 35 U.S.C. 154(b) by 293 days.

(21) Appl. No.: 15/273,662

(22) Filed: Sep. 22, 2016

(65) Prior Publication Data

US 2017/0336920 A1 Nov. 23, 2017

Related U.S. Application Data

(60) Provisional application No. 62/337,818, filed on May 17, 2016.

(51) Int. Cl.
*G06F 3/048* (2013.01)
*G06F 3/0481* (2013.01)
*G06Q 10/10* (2012.01)
*G07C 5/08* (2006.01)

(52) U.S. Cl.
CPC ........... *G06F 3/0481* (2013.01); *G06Q 10/10* (2013.01); *G07C 5/0825* (2013.01)

(58) Field of Classification Search
CPC .......... G06F 3/00; G06F 3/048; G06F 3/0481; G06F 3/0484; G07C 5/08; G07C 5/0825; B60K 35/00; G06Q 10/10
See application file for complete search history.

(56) References Cited

U.S. PATENT DOCUMENTS

| | | | |
|---|---|---|---|
| 7,073,129 B1* | 7/2006 | Robarts | G06Q 10/10 463/36 |
| 2006/0123339 A1* | 6/2006 | DiMichele | G07F 17/32 715/700 |
| 2011/0187547 A1* | 8/2011 | Kweon | B60K 35/00 340/670 |
| 2013/0038437 A1 | 2/2013 | Talati et al. | |
| 2015/0191122 A1* | 7/2015 | Roy | G08G 1/0962 340/439 |
| 2015/0266377 A1* | 9/2015 | Hampiholi | B60K 35/00 455/466 |

(Continued)

OTHER PUBLICATIONS

International Search Report and Written Opinion in International Application No. PCT/US2016/063872, dated Feb. 8, 2017, 10 pages.

(Continued)

*Primary Examiner* — Xiomara L Bautista
(74) *Attorney, Agent, or Firm* — Shumaker & Sieffert, P.A.

(57) ABSTRACT

In some implementations, vehicle data indicating a state of a vehicle is received. A current vehicle context is determined based on the vehicle data. Message data indicating one or more candidate messages is received, with each message having a corresponding display context. It is determined whether a particular message of the candidate messages has a display context that matches the current vehicle context. In response to determining that a particular message of the candidate messages has a display context that matches the current vehicle contexts, the particular message is provided for output on a display of the vehicle.

20 Claims, 10 Drawing Sheets

Vehicle During A Complete Stop In Traffic Jam

(56) References Cited

U.S. PATENT DOCUMENTS

| | | | | |
|---|---|---|---|---|
| 2015/0350335 A1* | 12/2015 | Zhang | ................... | H04L 51/36 |
| | | | | 709/228 |
| 2016/0150020 A1* | 5/2016 | Farmer | ................. | H04L 67/12 |
| | | | | 455/420 |
| 2016/0216130 A1* | 7/2016 | Abramson | ......... | G01C 21/3626 |
| 2016/0381658 A1* | 12/2016 | Ghosh | ................... | H04L 67/22 |
| | | | | 455/458 |
| 2017/0048348 A1* | 2/2017 | Chen | ................... | H04L 67/306 |
| 2017/0185265 A1* | 6/2017 | Pierce | ................... | H04W 4/14 |
| 2017/0330044 A1* | 11/2017 | Telpaz | ................ | G05D 1/0088 |
| 2018/0109389 A1* | 4/2018 | Buckley | ............... | H04L 63/126 |

OTHER PUBLICATIONS

Written Opinion issued in International Application No. PCT/US2016/063872, dated Mar. 21, 2018, 5 pages.

International Preliminary Report on Patentability issued in International Application No. PCT/US2016/063872, dated Aug. 17, 2018, 15 pages.

* cited by examiner

MANAGING MESSAGES IN VEHICLES

CROSS-REFERENCE TO RELATED APPLICATIONS

This application claims the benefit of the U.S. Provisional Patent Application No. 62/337,818 filed May 17, 2016 and entitled "Managing Messages in Vehicles," which is incorporated herein by reference in its entirety.

FIELD

This specification generally relates to managing messages in a vehicle.

BACKGROUND

The increased availability of accessing information resources via the networks such as the Internet has led to a user of one or more devices being inundated with messages such as cards, notifications, alerts, or the like related to any number of topics. For instance, a user of a smart phone may typically receive messages in the form of notifications related to breaking news from one or more news agencies.

Users may be particular interested in such messages because the messages can provide the user with helpful information that can be consumed in a very short period of time. For instance, a message can be displayed on mobile device that includes a breaking new headline, notification of a change in traffic conditions on the user's route, a change in weather conditions, a nearby restaurant, or the like.

Such messages may make it exceedingly efficient for a user to multitask. For instance, a user engaged in a first task may quickly glance at a user interface of a device, consume the content of the message, and then continue performing the first task. In some instances, the user does not need to stop performing the first task to consume the content of the message. Though it may be for a short time period, the message does direct the user's attention from performance of the first task to the message. In some instances, such as when operating a vehicle, a diversion of the vehicle operator's attention—for even an extremely short period of time—can be dangerous.

SUMMARY

In some implementations, a vehicle includes a processing system that manages the messages presented to an occupant of the vehicle. The processing system may receive candidate messages from a variety of sources, such as different applications executing on the processing system. Using information about the current state of the vehicle, as well as current tasks or needs of the user, the system can identify which candidate messages are most relevant and present the relevant messages in a manner that does not distract the driver. The processing system may be a standalone system embedded into a vehicle, such as a head unit in a vehicle's front console.

Among other functions, the processing system can match candidate messages to the appropriate contexts to ensure that the driver and other vehicle occupants receive contextually relevant information that does not distract from the core task of driving the vehicle. To facilitate this process, applications may provide candidate messages according to predetermined template formats, and can assign particular contextual factors indicating when those messages should be displayed. The processing system can also group messages into different clusters, rank the messages within the clusters, and prioritize messages for display based on the cluster assignments and rankings. Some vehicles include multiple screens. The processing system can determine on which screen or screens the messages should be displayed, providing appropriate information for each region of the vehicle. As users interact with different messages and different screens, the processing system can learn the user's preferences and tailor the future messages to the user's preferences.

In some aspects, the subject matter embodied in this specification may be embodied in methods that include the actions of receiving vehicle data indicating a state of a vehicle, determining a current vehicle context based on the vehicle data, receiving message data indicating one or more candidate messages, each message having a corresponding display context, determining whether a particular message of the candidate messages has a display context that matches the current vehicle context, and in response to determining that a particular message of the candidate messages has a display context that matches the current vehicle contexts, providing the particular message for output on a display of the vehicle.

Other versions include corresponding systems, apparatus, and computer programs, configured to perform actions of the methods, encoded on computer storage devices.

These and other versions each may optionally include one or more of the following features. For instance, in some implementations, the method may include in response to determining that a particular message of the candidate messages has a display context that does not match the current vehicle context, discarding the message without providing the message for display on a screen of the vehicle.

In some implementations, the method may include determining that each of multiple messages of the candidate messages has a display context that matches the current vehicle context, clustering the multiple messages into multiple respective groups based on (i) a display context associated with each message, or (ii) an application that generated the message, and assigning a priority value to each message based on clustered message's group.

In some implementations, the method may also include ranking the messages based on the assigned priority value, and providing the messages for output on the display of the vehicle based on the ranking.

In some implementations, the method may further include detecting user feedback associated with the particular message after the message was output on the display of the vehicle, determining whether the user feedback includes (i) positive interaction or (ii) negative interaction, and in response to determining that the user feedback includes positive interaction, increasing a quality score associated with the message.

In some implementations, the method may further include in response to determining that the user feedback includes negative interaction, decreasing the quality score associated with the message.

In some implementations, the method may further include determining the current vehicle context at the time the user feedback was received, and updating the quality score for the message that is associated with a display context that matches the current vehicle context at the time the user feedback was received based on user feedback.

The details of these, and other, implementations are set forth in the accompanying drawings and the description below. Other features and advantages will be apparent from the description and drawings, and from the claims.

DETAILED DESCRIPTION

Aspects of the present disclosure describe an in-vehicle system that manages messages delivered to occupants of the vehicle based on the current context of the vehicle. The in-vehicle system may use a control unit to collect vehicle data, interface with message generating application, and select a vehicle display that can be used to output generated messages based on the vehicle's context. The in-vehicle system may receive feedback from a vehicle occupant which the system can use to personalize messages provided for output to vehicle occupants in the future.

Figure 1:
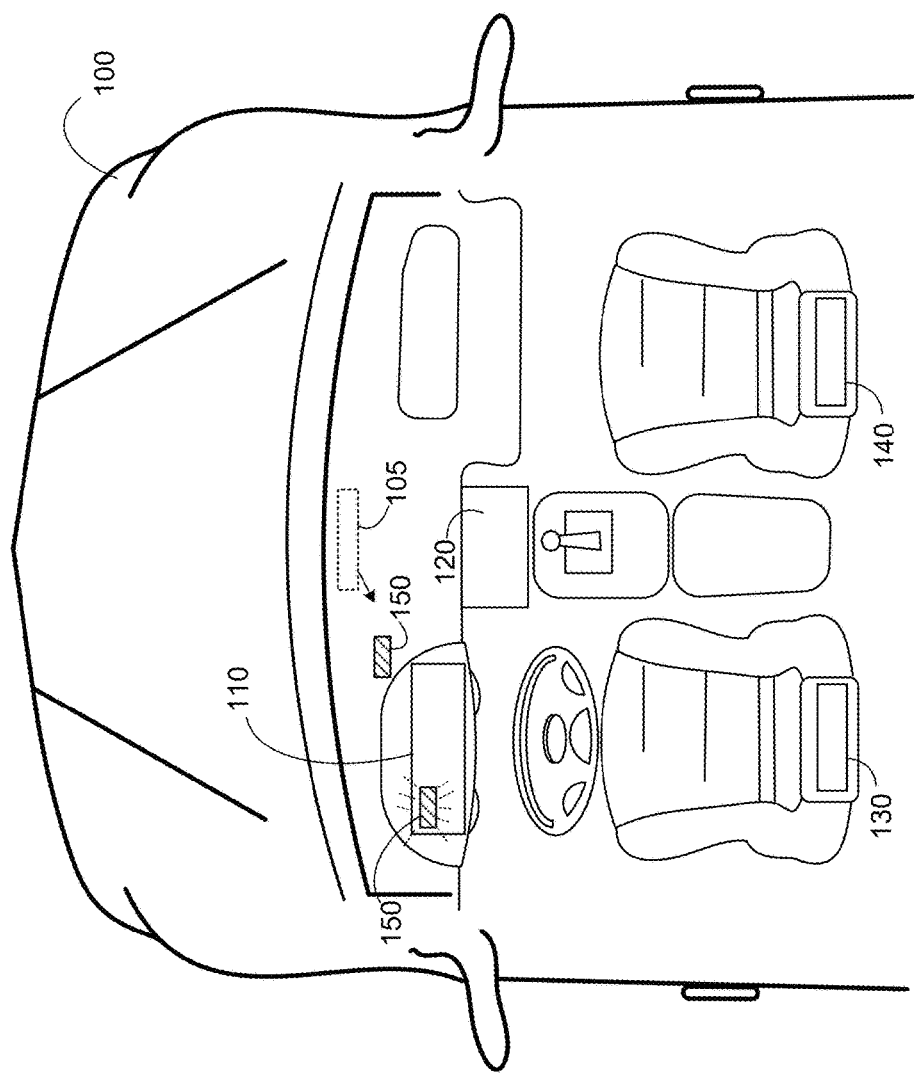
FIG. 1 is a contextual diagram of a system for managing messages to an occupant of a vehicle based on the current context of the vehicle.

FIG. 1 is a contextual diagram of a system for managing messages to an occupant of a vehicle 100 based on the current context of the vehicle 100. In the contextual diagram of FIG. 1, the vehicle 100 is driving in free flow traffic on a highway.

The vehicle 100 includes a control unit 105. The control unit 105 can interface with multiple vehicle sensors, multiple message generating applications, and multiple displays 110, 120, 130, 140 that are mounted to the vehicle 100. The displays mounted to the vehicle 100 may include an instrument panel 110, a center console 120, a display 130 mounted to the back of the driver's seat, and a display 140 that is mounted to the back of the passenger seat. The control unit 105 can be used to manage the presentation of messages that are generated by the message generating applications via one or more of the vehicle displays 110, 120, 130, 140 without distracting a driver of the vehicle.

The control unit 105 can determine the current context of the vehicle based on vehicle data obtained from one or more vehicle sensors, vehicle applications, or the like. For instance, in the example of FIG. 1, the control unit 105 may receive data from vehicle sensors or vehicle applications indicating, for example, that the engine of vehicle 100 is on, the vehicle 100 is travelling 70 mph, and that the vehicle 100 is traveling on Interstate 95. The control unit 105 may map the obtained vehicle data to a current context such as, for example, driving in freeflow traffic on a highway. The control unit 105 may then obtain a message 150 that has been generated by a message generating application, and provide the message 150 for display on one, or multiple, vehicle mounted displays. The particular message obtained by the control unit 105 may be based on the current context of the vehicle 100.

In the example of FIG. 1, the control unit 105 determines that the message 150 should be displayed on the driver's instrument panel 110 and not the center console 120, display 130 on the back of the driver's seat, or the display 140 on the back of the passenger's seat. The control unit 105 may display the message 150 on the instrument panel 110 as opposed to one or more of the displays of vehicle 105 in order to avoid taking the user's eyes away from the road. When displayed in the instrument panel, the message 150 is in the user's line of sight while looking at the road. In this context, the control panel 105 can avoid displaying the message 105 on the center console because, for example, displaying the message 150 via the center console may require the driver of vehicle 105 to take his/her eyes off the road and towards the center console, thereby creating an increased risk of a collision with another object.

Figure 2:
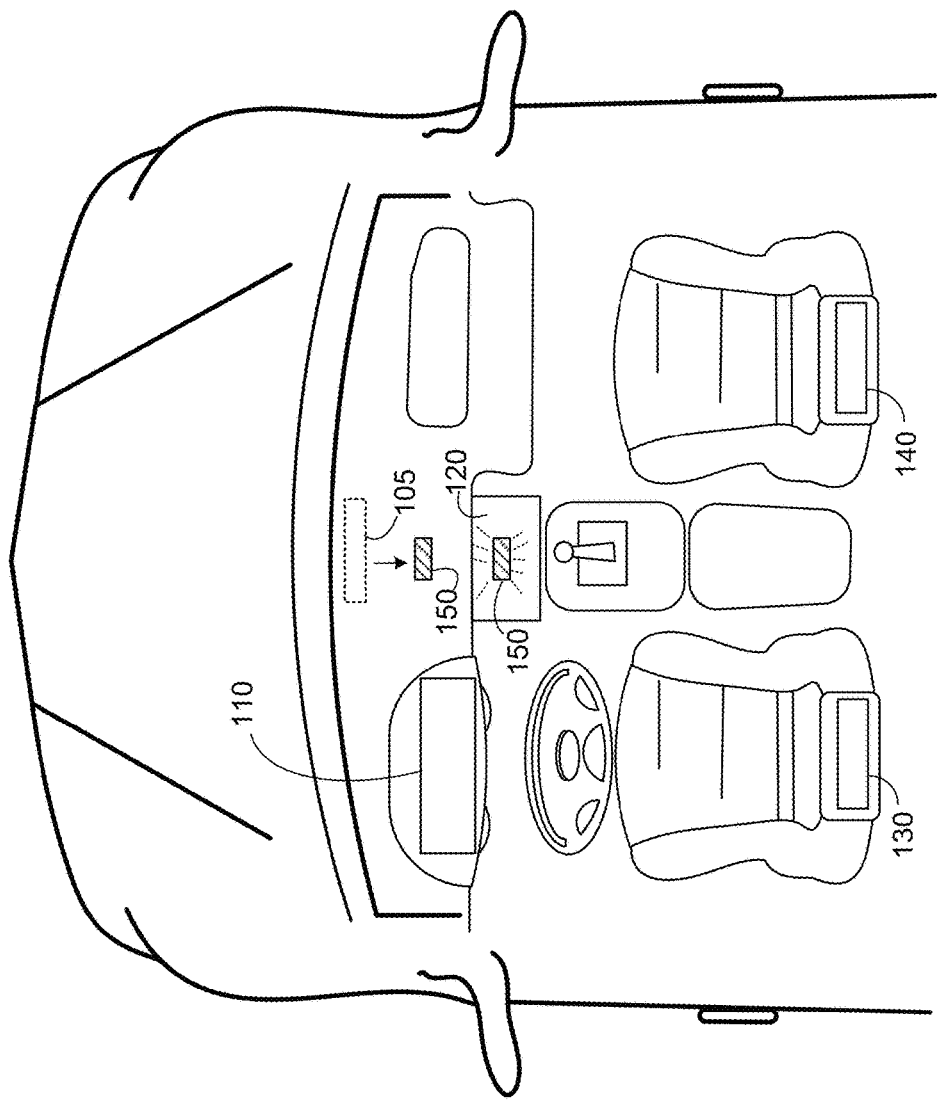
FIG. 2 is a contextual diagram of another example of a system for managing messages to an occupant of a vehicle based on the current context of the vehicle.

FIG. 2 is a contextual diagram of another example of a system for managing messages to an occupant of a vehicle 200 based on the current context of the vehicle 200. The vehicle 200 may be the same, or substantially similar, to the vehicle 100 discussed with respect to FIG. 1. For instance, the vehicle 200 includes a control unit 205 that is the same, or substantially similar, to control unit 105. However, in the contextual diagram of FIG. 2, the vehicle 200 is a car that has come to a complete stop in a traffic jam.

The control unit 205 can determine the current context of the vehicle 200 based on vehicle data obtained from one or more vehicle sensors, vehicle applications, or the like. For instance, in the example of FIG. 2, the control unit 205 may receive data from vehicle sensors or vehicle applications indicating, for example, that the engine of 100 is on, the vehicle 100 is currently stopped with a speed of 0 mph, and the vehicle is traveling on Interstate 95. The control unit 205 may map the obtained vehicle data to a current context such as, for example, stopped in traffic jam. The control unit 205 may then obtain a message 250 that has been generated by a messaging generating application, and provide the message 250 for display on one, or multiple, vehicle-mounted displays. The particular message obtained by the control unit 205 may be based on the current context of the vehicle 200.

In the example of FIG. 2, the control unit 205 determines that the message 250 should be displayed on the center console 220 and not the instrument panel 210, the display 230 on the back of the driver's seat, or the display 240 on the back of the passenger's seat. The control unit 205 may display the message 250 on the center console 220 because the control unit 205 determines, from the current context of the vehicle 200, that the vehicle 200 is stopped. As a result, the control unit 205 can display the message 250 on the center console, which may provide a larger, more interactive display interface than the display interface that corresponds to the instrument panel 210. Since the car is stopped, the message may be displayed on the center console without creating a dangerous distraction to the driver of vehicle 200.

Figure 3:
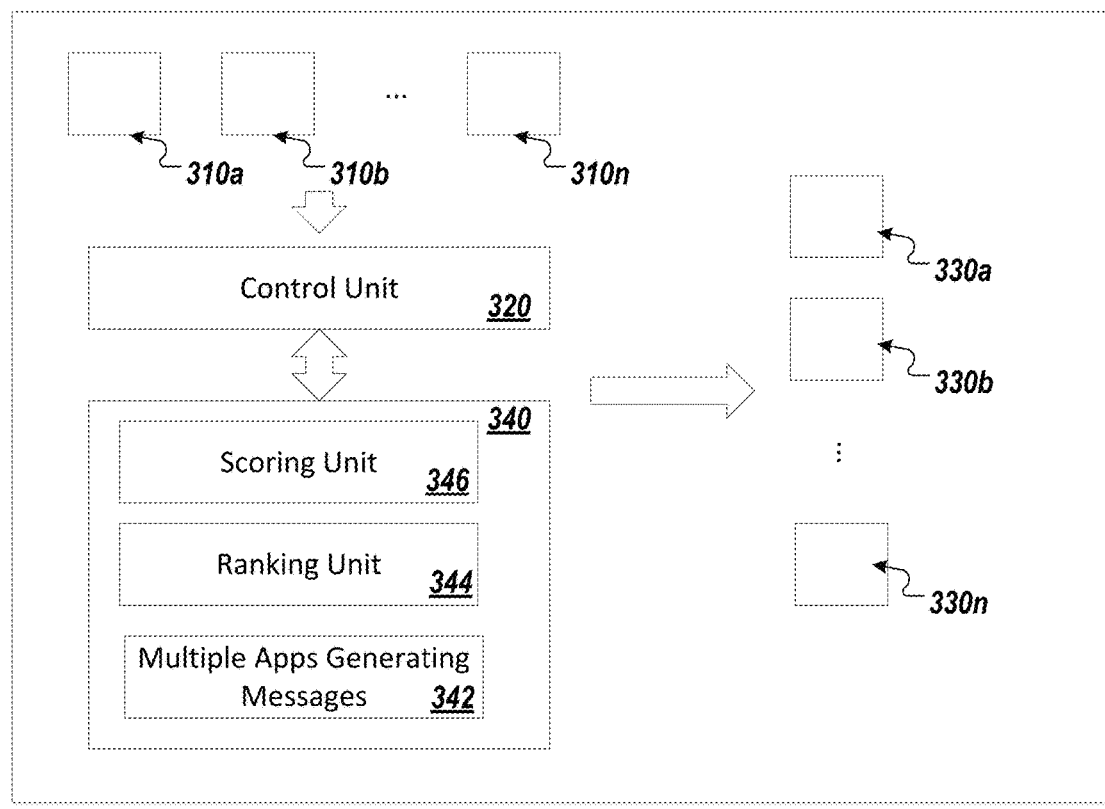
FIG. 3 is a block diagram of an example of a system for managing messages to an occupant of a vehicle based on the current context of the vehicle.

FIG. 3 is a block diagram of an example of a system 305 for managing messages to an occupant of a vehicle 300 based on the current context of the vehicle 300. The system 305 is implemented within a vehicle 300, and includes multiple vehicle sensors 310a, 310b, . . . 310n, a control unit 320, multiple displays 330a, 330b, . . . 330n, and a vehicle context-based messaging unit 340. The vehicle context-based messaging unit 340 can include multiple applications 340 that generate candidate messages, a ranking unit 344, and a scoring unit 346.

Vehicle sensors 310a, 310b, . . . 310n are devices that are capable of detecting data indicative of a current attribute that is associated with a current state of a vehicle 305. For example, vehicle sensors 310a, 310b, 310n may include a speed sensor, a temperature sensor, a fuel sensor, an engine on/off sensor, a tire pressure sensor, or the like. The vehicle sensors 310a, 310b, . . . 310n can determine a variety of physical parameters about the operation of the vehicle.

In some implementations, the control unit 320 receives input from one or multiple applications that provide information regarding the current state of the vehicle. For instance, a navigation application such as, a GPS application may provide information regarding the vehicle's 300 current trip including, for example, the vehicle's 300 point of origin, the vehicle's 300 destination, the vehicle's current location, or the like. Another application may include, for example, a weather application that provides data indicative of the road conditions in a particular geographic area such as, for example, whether there is snow on a particular road in a particular city.

Each vehicle sensor 310a, 310b, 310n may be configured to periodically broadcast the current attribute value detected each respective sensor 310a, 310b, . . . 310n. For instance, the vehicle sensors 310a, 310b, . . . 310n may broadcast the current attribute value detected each respective sensor 310a, 310b, . . . 310n every second, every three seconds, every five seconds, or the like. Alternatively, or in addition, one or multiple vehicle sensors 310a, 310b, . . . 310n may provide the current attribute value detected by one or more of sensors 310a, 310b, . . . 310n in response to a request for vehicle data from one or more of sensors 310a, 310b, . . . 310n. Input can be obtained from applications in the same manner as with the vehicle sensors.

The control unit 320 may be configured to interface with the vehicle sensors 310a, 310b, . . . 310n, the multiple displays 330a, 330b, . . . 330n, and the vehicle context-based messaging unit 340. The control unit 320 can obtain vehicle data that is indicative of the state of the vehicle from one, or multiple vehicle sensors 310a, 310b, . . . 310n. For instance, the control unit 320 can detect vehicle data that is indicative of the current state of the vehicle 300 that is broadcast by the vehicle sensors 310a, 310b, . . . 310n. Alternatively, or in addition, the control unit 320 may request a current reading of one, or multiple vehicle sensors 310a, 310b, . . . 310n. The control unit 320 can map the detected vehicle data to one, or multiple, predetermined vehicle contexts. In some implementations, a set of multiple predetermined vehicle contexts are defined, and the control unit 320 selects, from the set, which vehicle contexts are applicable at the current time. The vehicle contexts thus allow the control unit 320 to specify the current conditions present in a standardized manner. Each vehicle context may represent a task, situation, or state of the vehicle, and may be identified based on one or multiple factors. The predetermined vehicle context can be used to identify one, or multiple candidate messages, that may be relevant to an occupant of the vehicle 305 at the current time. For instance, the multiple applications 340 can generate candidate messages, and each candidate message can indicate a context in which display would be appropriate. The control unit 320 may use the current vehicle contexts that indicate the state of the vehicle to select one, or multiple, candidate messages generated by the multiple applications 340. Candidate messages associated with a context that matches the current vehicle contexts can be selected, while others can be ignored and not displayed. The predetermined vehicle contexts may fall into a particular category such as, time, car state, type of trip, places and location, environmental conditions, traffic conditions, car conditions, car alerts, or the like. Each particular category of vehicle contexts may be associated with multiple different vehicle contexts.

Each particular category of predetermined vehicle contexts may include, one or multiple, vehicle contexts. For instance, the time category of predetermined vehicle context can be used to identify messages that fall within a particular predetermined time period. For instance, the vehicle sensors may broadcast data that is detected by the control unit 320 indicating that the vehicle 305 is in operation at 8:00 am. Based on the determination that the vehicle is in operation at this particular time, the control unit 320 may identify a subset of messages that are relevant to the morning time period such as, advertisements for restaurants that serve coffee, breakfast, or the like and are located within a predetermined distance of the vehicle's current location and/or along the vehicle's current road trip, as determined by a GPS navigation system.

The trip type category may provide a context that indicates whether the vehicle operator is travelling longer or shorter than a 2 hour trip. A long trip or short trip context can be used to select particular messages that may be relevant for a long trip or short trip respectively. For instance, if it is determined that a vehicle's 305 context is currently associated with a traveling long trip context, then the control unit 320 may select messages related to coffee houses or fuel stations while ignoring messages related to parking lots. Alternatively, if a vehicle's context is currently associated with a travelling short trip context along a route that the vehicle occupant typically travels, the control unit 320 may ignore messages associated with local restaurants and/or coffee shops that the vehicle occupant may be intimately familiar with, and potentially suggest a parking lot that may be used to park the vehicle 305.

The places and location category may provide a context that indicates relevant proximity that can be used to establish a search for relevant places or events within the relevant proximity of the vehicle using latitude or longitude, or the like. The environmental conditions context category may provide multiple contexts that each indicate an attribute of the outside environment that the car is currently travelling through such as, for example, whether it is currently cloudy, foggy, rainy, snowy, sunny, stormy, windy, or the like. The road conditions category may provide multiple contexts that indicate the road conditions of the road that the vehicle 305 is currently travelling on such as, freeflow, jam, accident, complex intersection/merging freeway, or the like. The car conditions context may include, for example, multiple contexts that can indicate the conditions of a car such as, for example, speed, day/night, location, wipers, inside temperature, outside temperature, fuel level, or the like. The car alert category may include, for example, contexts that are corresponds to an alert associated with a car's operation such as check engine, flat tire, low tire pressure, or the like.

The control unit 320 can use the current vehicle context that is based on the vehicle state data obtained from the vehicle sensors 310a, 310b, . . . 310n to identify a set of one or multiple messages from the candidate messages generated by the multiple applications 342. Each of the multiple applications 342 may be configured to generate multiple messages. Each generated message may be associated with one or more multiple contexts. Though each of the multiple applications 342 may generate large quantities of messages, the control unit 320 may limit the number of messages that are displayed on one or multiple vehicle displays 330a, 330b, . . . 330n using the current vehicle context. For instance, once the control unit 320 determines the current vehicle context, the control unit 320 may use the current vehicle context to filter the stream of messages being output by the multiple applications 342. Alternatively, or in addition, the control unit 320 may request a set of one or multiple messages based on the current vehicle context.

The system 300 can include multiple vehicle displays such as vehicle displays 330a, 330b, . . . 330n. The multiple vehicle displays may include, for example, an instrument panel, a center console, a display in the back of a driver's seat, a display in the back of the passenger's seat, or the like. The control unit 320 can use the current vehicle context to select a particular one or more of the vehicle displays of the multiple vehicle displays 330a, 330b, . . . 330n that should be used to display a message. For instance, the control unit 320 may avoid selecting a vehicle display such as, for example, the center console to display a message while a current context of the vehicle 305 indicates that the vehicle is driving in freeflow traffic on a highway. Alternatively, for example, the control unit 320 may select a vehicle display such as, for example, the center console to display a message while a current context of the vehicle 305 indicates that the vehicle has come to a complete stop in a traffic jam. Alternatively, or in addition, the control unit 320 may determine that certain messages should only be displayed on display unit on the back of the driver's seat, the display unit on the back of the passenger's seat, or both. For instance, the control unit 320 may determine to display data associated with a particular song that is playing on a radio station on only the displays on the back of the driver's seat, back of the passenger seat, or both to avoid distracting the driver with messages related to the song on the radio station.

The multiple applications 242 may generate candidate messages for display on one or multiple vehicle displays 330a, 330b, . . . 330n. The candidate messages may include multiple different kinds of messages that include, for example, cards, notifications, alerts, or the like. The multiple applications 242 may include any type of application that can be used to provide data to an occupant of a vehicle such as, a navigation application, a media application, a vehicle control application, a restaurant application, a coffee house application, a fuel management application, a social networking application, a calendar application, a task management application, or the like. In some implementations, the multiple applications 242 may be the same as, or similar to, the types of applications available for a mobile smartphone.

One or more contexts may be associated with each generated message. For instance, a message generated by a coffee shop application may be associated with a location context. In such instances, the control unit 320 may select the coffee shop message for display on a vehicle display when the current context of a user's vehicle indicates that the user's vehicle is within a predetermined proximity of the coffee shop. Alternatively, for example, a message generated from a fuel management application may be associated with a travelling long trip context and a fuel level context. In such instances, the control unit 320 may select the message from the fuel management application when it is determined that the current context of the control unit detects that the occupant of the vehicle 305 intends to take a long trip, e.g., by setting a distant location as a navigation destination, and the vehicle's fuel level is below a threshold level that is necessary to complete the long trip. Other types of contexts may be associated with a particular message, as described further below.

Each independent developer of each particular application of the multiple applications 242 may program each respective application to generate messages for display on one or more multiple vehicle displays for any reason. For instance, a developer may program an application to periodically generate advertisements for particular products. Alternatively, or in addition, a particular developer may program a particular application to only generate a message in response to one or more particular trigger conditions. For instance, a navigation application may be programmed to only generate a message in response to the detection of an upcoming navigational instruction such as, turn left in 500 feet. However, in each of these alternative scenarios, the control unit 320 is used to select a particular one or multiple of the generated candidate messages for display on the one or multiple vehicle displays 330a, 330b, . . . 330n based on the current vehicle context. In this manner, the control unit 320 may be used to control attempts by application developers to spam vehicle occupants with multiple advertisements, or other forms of mass messages.

In some instances, the control unit 320 may obtain multiple messages that correspond to the current vehicle context. In such instances, a ranking unit 344 and scoring unit 346 can be utilized in order to determine message priority levels.

The ranking unit 344 can be used to associate a priority level with a particular message based on the message context. In some implementations, the ranking unit 344 may cluster messages generated by the multiple applications 342. For instance, the ranking unit 344 determine whether each message of the multiple messages generated by the multiple applications 342 is a critical alert, a currently ongoing activity, or a message related to upcoming events/other. The ranking unit 344 may cluster the messages into one of the aforementioned categories based on the one or more of the type of application used to generate the message, a message policy stored in a memory unit that is accessible by the ranking unit 344, or a particular type of context, or other characteristic, that is associated with the generated message.

The critical cluster may include a group of messages related to critical warnings related to the operating status of the vehicle 305. The ranking unit 344 may associate messages with the critical cluster based on the determination that the messages were generated by an application that is used to monitor the operating status of the vehicle. Alternatively, or in addition, the ranking unit 344 may associate such messages with the critical cluster if the messages are associated with a car alert context, or the like. Such car alert contexts are typically related to low tire pressure, a flat tire, engine failure, overheating engine, low coolant, or the like. In one implementation, messages that are associated with the critical cluster may be assigned the highest level of priority. Accordingly, a generated message associated with the critical cluster may be assigned a primary level of priority and may be displayed on top of any other message of a lower priority level.

The currently ongoing activity cluster may include a group of messages related to ongoing activities. The ranking unit 344 may associate messages with the currently ongoing activity cluster, for example, if the message is generated by an application that is performing a task to assistant an occupant of the vehicle that is not yet complete. An example of such an ongoing activity may include, for example, the use of a navigation application during an active navigation session that is providing step-by-step directions to an operator of a vehicle to guide the operator of the vehicle to the operator's intended destination. Applications that are assisting a user in an ongoing activity may provide messages to the user for as long as the ongoing activity such as, turn-by-turn directions conveyed to the occupant of the vehicle by an automated GPS assistant. Messages in the currently ongoing activity cluster may be assigned a secondary level of priority. To the extent multiple messages are identified by the control unit 320 as having the same, or substantially similar, context to the current vehicle context, messages from the critical cluster will be shown on top of message from the currently ongoing activity cluster, as message from the critical cluster are assigned primary level of priority.

The upcoming events/other cluster may include a group of message related to upcoming events. The ranking unit 344 may associate messages with the upcoming events/other cluster if the message is generated by an application that is related to providing recommendations for a product or service to an occupant of a vehicle 305 based on the vehicle's proximity to a particular restaurant, shop, or the like. For instance, message classified into this cluster may be associated with a proximity context. In such instances, a message associated with the upcoming events/other cluster may be displayed when the vehicle 305 travels within a predetermined proximity of a restaurant that corresponds to a particular restaurant application of the multiple applications 342 that are used to generate candidate messages. Alternatively, or in addition, the ranking unit 344 may associate messages with the upcoming events/other cluster if the message is generated by an application that is related to providing reminders to an occupant of the vehicle based on a user's task list, calendar, or the like. For instance, an application may generate a message to an occupant of the vehicle 305 that reminds the occupant of the vehicle 305 of an upcoming meeting, or other event. Such a reminder message may be generated based on a time context or a location proximity context. Alternatively, or in addition, the ranking unit 344 may associated messages with the ongoing activities/other cluster if the ranking unit 344 determines that the message cannot be definitively classified as a critical message, an ongoing activity message, or an upcoming event message. Messages in the upcoming events/other cluster may be associated with a tertiary level of priority. To the extent multiple messages are identified by the control unit 320 as having the same, or substantially similar, context to the current vehicle contexts, messages from the critical cluster and ongoing activities clusters will be shown on top of messages from the ongoing events/other cluster, as messages from the critical cluster and ongoing activities cluster are associated with a primary level of priority and a secondary level or priority, respectively.

The system 300 can use the scoring unit 346 to, over time, learn from user feedback associated with messages that have been displayed on one or multiple vehicle displays. For instance, the scoring unit 346 may utilize a log that tracks which messages a user has positively interacted with (e.g., message that the user have viewed, messages that the user has tapped, or otherwise selected, instances where a vehicle traveled to a destination that the was recommended by a particular message, or the like), and also those messages in which a user has negatively interacted with (e.g., a user has chosen to hide, ignore, or otherwise discard the message). For instances where a user has positively interacted with a message, a quality score associated with the message may be increased. Alternatively, for those instances where a user has negatively interacted with a message, the scoring unit 346 may decrease a quality score associated with the message. Those a quality score may be associated with each message, as described above, it is also contemplated that the quality score may also (or alternatively) be associated with the application that generated the message. That is, if a vehicle occupant does not like coffee, and over time, tends to discard recommendations to visit a coffee house while on a road trip in the vehicle 305, then the system may associated a low quality score with the coffee house application. In some implementations, the quality score may be a number that ranges from 0 to 1, and anywhere in between. A number of ratios may be used to calculate the quality score such as, for example, a ratio of views vs. dismissals, a ration of views vs. tap throughs, or the like.

The quality score may be associated with a particular message, particular application, or both, for only certain contexts. For instance, it may be determined that a vehicle occupant positively interacts with message that includes a recommendation to visit a coffee house when driving to work at a particular time (e.g., the morning). However, it may also be determined that the same vehicle occupant negatively interacts with the same message providing the same recommendation to visit the same coffee house in the evening when the vehicle occupant drives home from work (e.g., in the evening). Accordingly, the scoring unit may increase the quality score for the aforementioned message that is associated with the "morning' context by decrease the quality score for the aforementioned message with the "evening" context.

In some instances, the quality score may be user-specific. That is, the quality score may be generated from a user log that has tracked user feedback with messages by only occupants of a single vehicle. However, the present disclosure need not be so limited. For instance, it is contemplated that the vehicle 305 may include an interface to one or more wireless networks such as, for example, a 3G, 4G, LTE, or other type of wireless cellular network. In such instances, the system 300 may connect to one or multiple cloud services. At least one cloud service may include a global log of user interactions across all users of the cloud service. Such a global log may be used to reduce the quality score of a particular message, a particular application, or both based on global user trends. For instance, analyze of a global log of user feedback with messages may yield the determination that users in Western Pennsylvania tend to discuss recommendations to visit a coffee house on weekday afternoons. Accordingly, the cloud service may propagate a quality score update to the scoring unit 346 of each vehicle 305 in Western Pennsylvania that reduces the quality score of the corresponding message, corresponding application, or both The ranking engine 344 may consider the quality score of the message, the application, or both when multiple messages are identified that correspond to a current vehicle context. In such instances, the ranking engine 344 may promote messages to a higher priority that are associated with a higher quality score. Alternatively, the ranking engine 344 may demote messages that are associated with a lower quality score. In some instances, the ranking engine 344 may discard, block, or otherwise deny all messages that are associated with a quality score that falls below a predetermined threshold from being provided on one or multiple vehicle displays 330*a*, 330*b*, . . . 330*n*.

The control unit 320 can manage display of messages across each vehicle display of the multiple vehicle displays 330a, 330b, . . . 330n. For instance, the control unit 320 may employ a screen policy that determines, for each message, which vehicle display of the multiple vehicle displays 330a, 330b, . . . 330n will be used to display the message. The policies may be based on the current context of a vehicle, and designed to provide messages to a user in a manner that minimizes distractions to the operator of the vehicle 305. In one implementation, for instance, a permissive policy may be employed when it is determined, from a current vehicle context, that the vehicle is parked, or not moving while in traffic. Under a permission policy, the control unit 320 may determine that messages to the user may be displayed on the center console, or other vehicle display, without causing a dangerous distraction to the user, since the car is not moving. Alternatively, in another implementations, for instance, a restrictive policy may be employed when it is determined, from a current vehicle context, that the vehicle 305 is moving at a high rate of speed on a highway. Under such a restrictive policy, the number of messages displayed to a user may be minimized, the messages may be displayed only in the instrument panel, or both. In yet other alternatives, there may intermediate policies that fall in the middle of the two ends of the spectrum. For instance, it may be determined that when messages may be displayed on the center console when the vehicle 305 is travelling less than 45 mph, and messages will be displayed in the instrument panel when the vehicle 305 is traveling greater than 45 mph. However, it is contemplated that the particular restrictions employed by each policy is flexible, and such policies may be customized, as necessary, by vehicle manufacturer based on the unique features of the particular vehicle such as, for example, the number of vehicle displays, the type of vehicle displays, the location of the vehicle displays, or the like.

Figure 4:
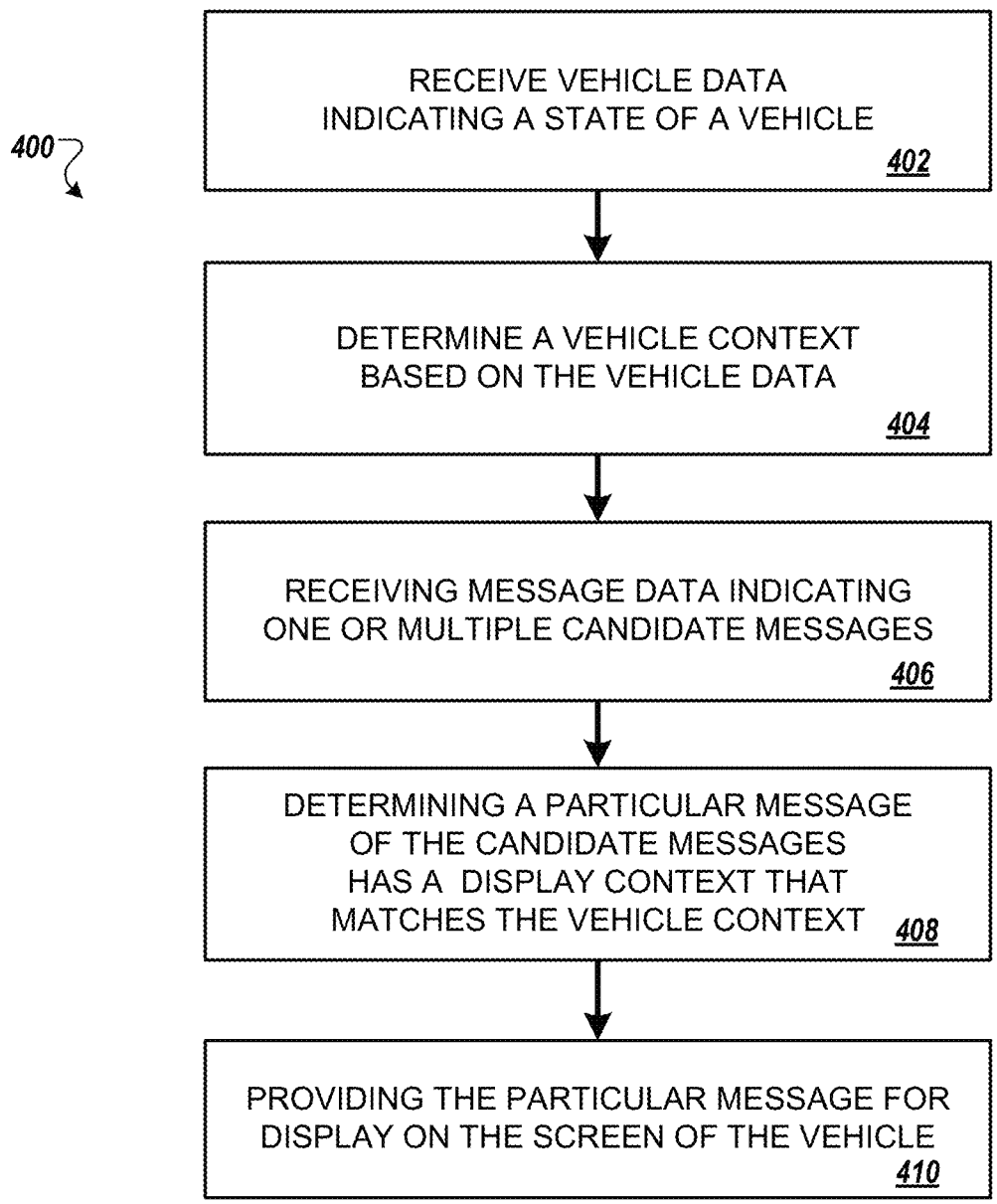
FIG. 4 is flowchart of an example of a process for managing messages to an occupant of a vehicle based on the current context of the vehicle.

FIG. 4 is flowchart of an example of a process 400 for managing messages to an occupant of a vehicle based on the current context of the vehicle.

The process 400 may begin at stage 402 with the control unit 320 receiving vehicle data indicating a state of the vehicle from one or multiple vehicle sensors 310a, 310b, . . . 310n. In one implementation, the control unit 320 may detect vehicle data that is periodically being broadcast by each of the multiple vehicle sensors. In the same, or other implementations, the control unit 320 may request vehicle data from one or multiple of the multiple vehicle sensors 310a, 310b, . . . 310n. In stage 404, the control unit 320 may determine a current vehicle context based on the received vehicle data. For instance, the control unit 320 may map the received vehicle data to one or multiple vehicle contexts. The set of one or multiple vehicle contexts for a particular time period may comprise the current vehicle context.

The process 400 may continue at stage 406 by the control unit 320 obtaining message data indicating one or multiple candidate messages that were generated by each of the multiple applications 342 stored in the vehicle's context-based messaging unit 340. In some implementations, the control unit 320 may detect data indicating one or multiple candidate messages that are periodically generated by each of the multiple applications 342. In the same, or other implementations, the control unit 320 may request a particular message(s) from one or multiple applications 342 based on the detection of a particular vehicle context. In response to the detection of data indicating that one or multiple messages were generated by the multiple applications 342, the process may continue at stage 408.

At stage 408, the control unit 320 may determine whether a particular message of the candidate messages has a display context that matches the vehicle contexts. In one implementation, the control unit 320 may obtain the current vehicle context and the display context that is associated with each message of the candidate messages. Then, the control unit 320 may compare each vehicle context in the current vehicle context to the display contexts associated with each message of the candidate messages. For instance, the current vehicle context may indicate that the vehicle is driving at a high rate of speed on a long trip via a highway. In such an instance, the control unit 320 may screen out all messages that are associated with a display context of "parked." Alternatively, for example, the system may identify messages that match each of the multiple vehicle contexts associated with the current vehicle contexts. For instance, the current vehicle context may indicate that the vehicle is driving on a long trip with a low amount of fuel. Accordingly, a messages from a fuel management app may be selected that are associated with a display context of driving, low fuel long trip. In response to identifying a particular message of the multiple candidate messages that is associated with a display context that matches the current vehicle context, the process may continue at stage 410. The process may continue at stage 410 by providing the particular message for display on the screen of the vehicle.

Figure 5:
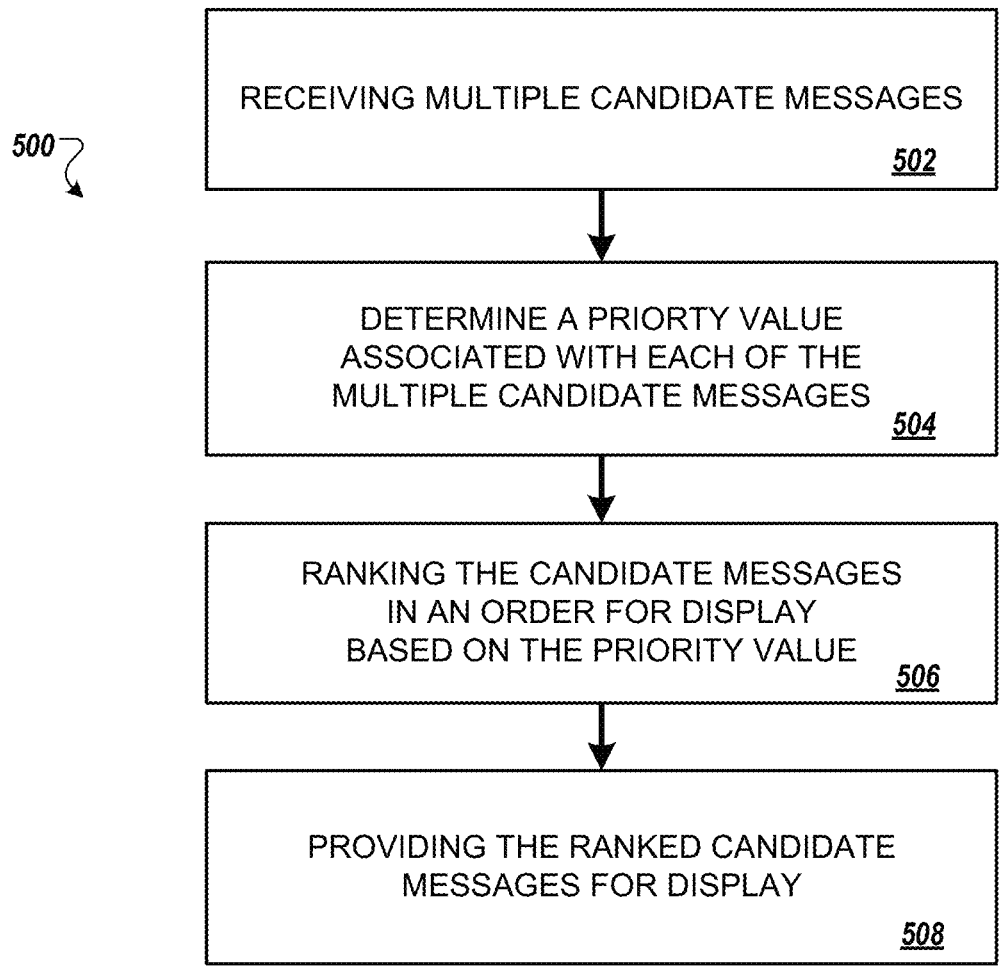
FIG. 5 is a flowchart of an example of a process for selecting a particular vehicle display from multiple vehicle displays that can be used to display a message.

FIG. 5 is a flowchart of an example of a process 500 for selecting a particular vehicle display from multiple vehicle displays that can be used to display a message.

The process 500 may begin at stage 502 with the receipt of multiple candidate messages. The ranking unit 344 may cluster the received candidate messages based on the type of application, the display context of the message, or both. A ranking unit 344 may determine a priority value that is associated with each message of the multiple candidate messages. The ranking unit may determine, at stage 504, a priority value particular cluster that each of the multiple candidate messages are associated with. The clusters may include, for example, a critical alerts cluster, ongoing activities cluster, or upcoming events/other cluster. In one implementations, messages associated with the critical alerts cluster are associated with the highest priority value, messages associated with the ongoing activities cluster are associated with the second highest priority value, and messages associated with the upcoming events/other cluster are associated with the third highest priority value. The ranking unit 344 may, at stage 506, rank the candidate messages in an order for display based on the priority values.

In some implementations, the messages may also, or alternatively, be ranked based on a quality score. For instance, a particular message's priority value may receive a boost based on a determination that an occupant of the vehicle has, over time, positively interacted with the message. Alternatively, for example, a particular message's priority value may be reduced based on a determination that an occupant of the vehicle has, over time, negatively interacted with the message. However, regardless of the quality score, in no event can a non-critical alert message be displayed in lieu of a critical alert message. However, in some implementations, a message with a high quality score can be displayed at the same time as a critical alert message.

Once the messages have been ranked, the process may continue at stage 508. At stage 508, the control unit 302 may output the ranked candidate messages for display to one or multiple vehicle displays, based on the ranking.

Figure 6:
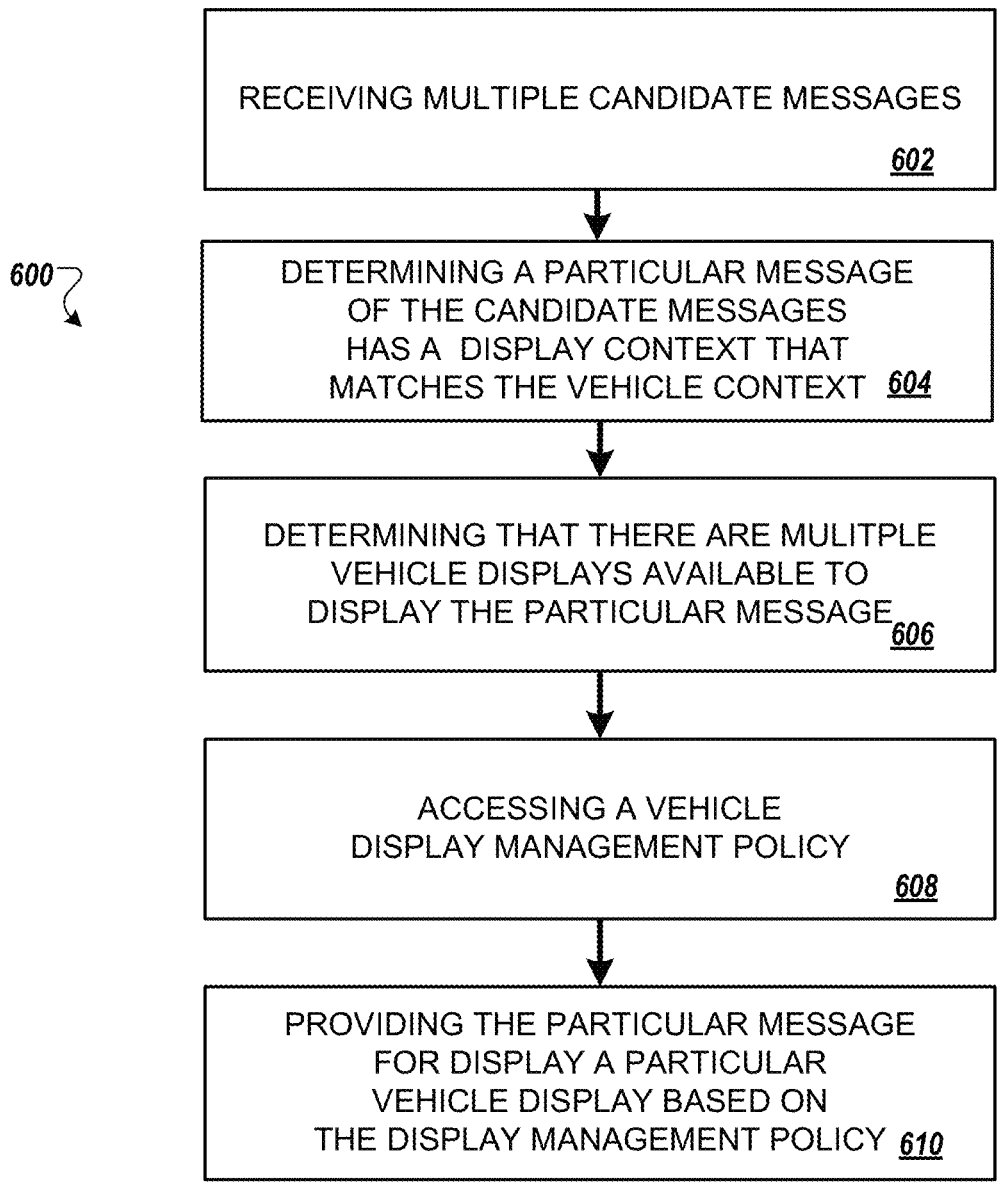
FIG. 6 is a flowchart of an example of a process for displaying messages to a vehicle occupant based on the priority value of the message.

FIG. 6 is a flowchart of an example of a process 600 for displaying messages to a vehicle occupant based on the priority value of the message.

The process 600 may being at stage 602 when the control unit 320 receives data indicative of multiple candidate messages. The control unit 320 may then perform at stage 604 one or multiple steps of the process 400 to determine whether a particular message from the set of candidate messages is associated with a display context that matches the current vehicle context. Then, the process 600 can continue at stage 604 by determining whether there are multiple vehicle displays available to display the particular message.

In response to determining that there are multiple vehicle displays available to display the particular message, the control unit 320 may access a vehicle display management policy at stage 608. The control unit 320 may select a particular vehicle display from the multiple vehicle displays that can be used to display the message based on the vehicle display management policy. Then, at stage 610, the control unit may provide the particular message to the particular vehicle display, based on the vehicle display management policy.

Figure 7:
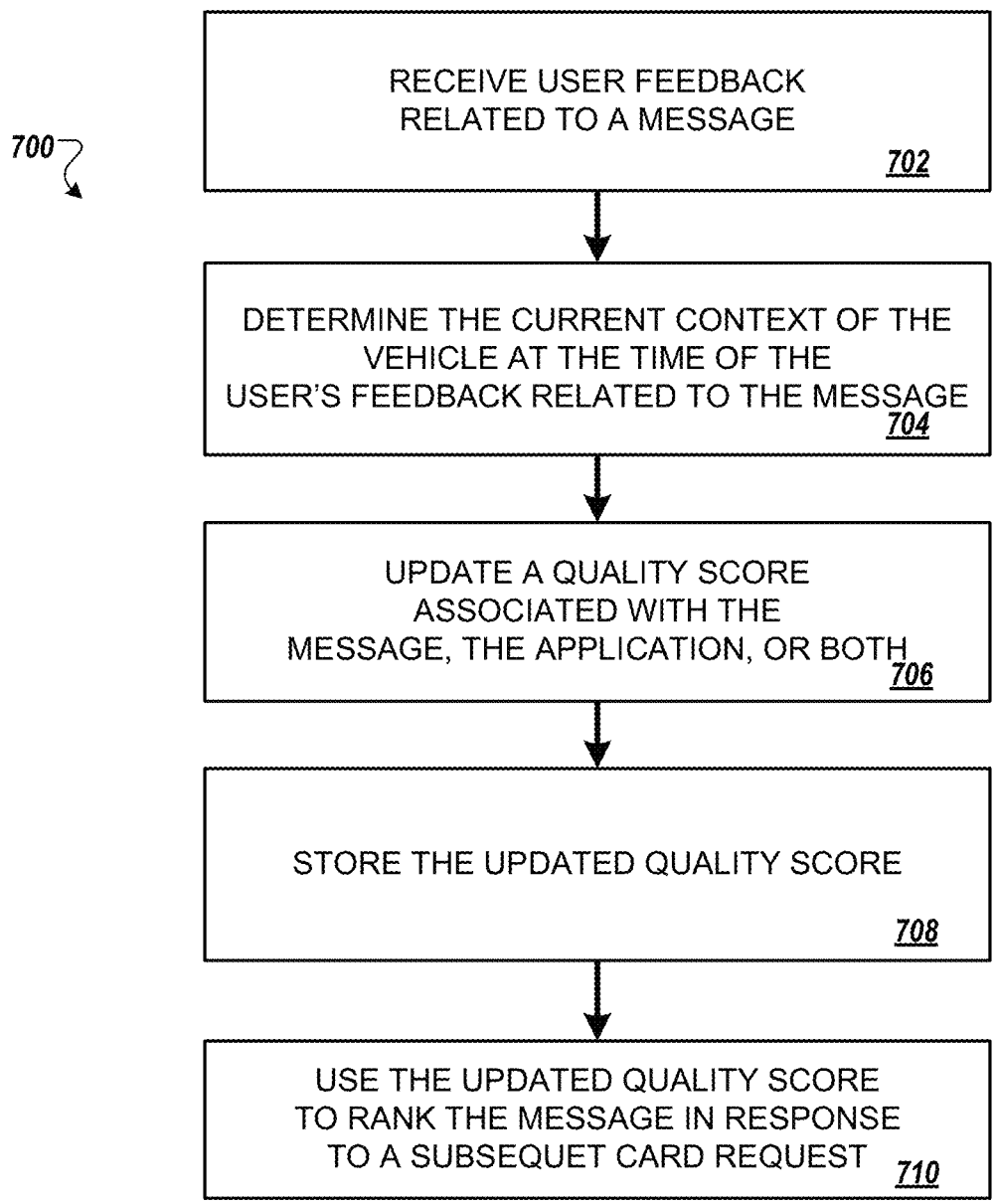
FIG. 7 is a flowchart of an example of a process for updating a quality score that is associated with an application.

FIG. 7 is a flowchart of an example of a process 700 for updating a quality score that is associated with an application.

The process 700 may begin at stage 702 with the scoring unit 346 receiving data that is indicative of user feedback that relates to a message that was displayed via a vehicle display 310a, 310b, . . . or 310n. User feedback may include positive interaction with the displayed message or negative interaction with the displayed message. In response to the receipt of user feedback that relates to the message, the control unit 346 may determine, at stage 704, the current context of the vehicle at the time the user's feedback was received. The scoring unit 346 can update the quality score that is associated with the message, the application that generated the message, or both based on the user's feedback. For instance, the scoring unit 346 may increase the quality score associated with the message, the application that generated the message, or both in response to the detection of positive interaction with the message. Alternatively, for instance, the scoring unit 346 may decrease the quality score associated with the message, the application that generated the message, or both in response to the detection of negative interaction with the message.

At stage 708, the scoring unit 346 may store the updated quality score. Alternatively, or in addition, the scoring unit 346 may also store data indicative of the user's feedback, the vehicle context at the time of the feedback, or both. The process may continue at stage 710. At stage 710, the ranking unit 344 may use the updated quality score to rank the message in response to a subsequent card request.

Figure 8A:
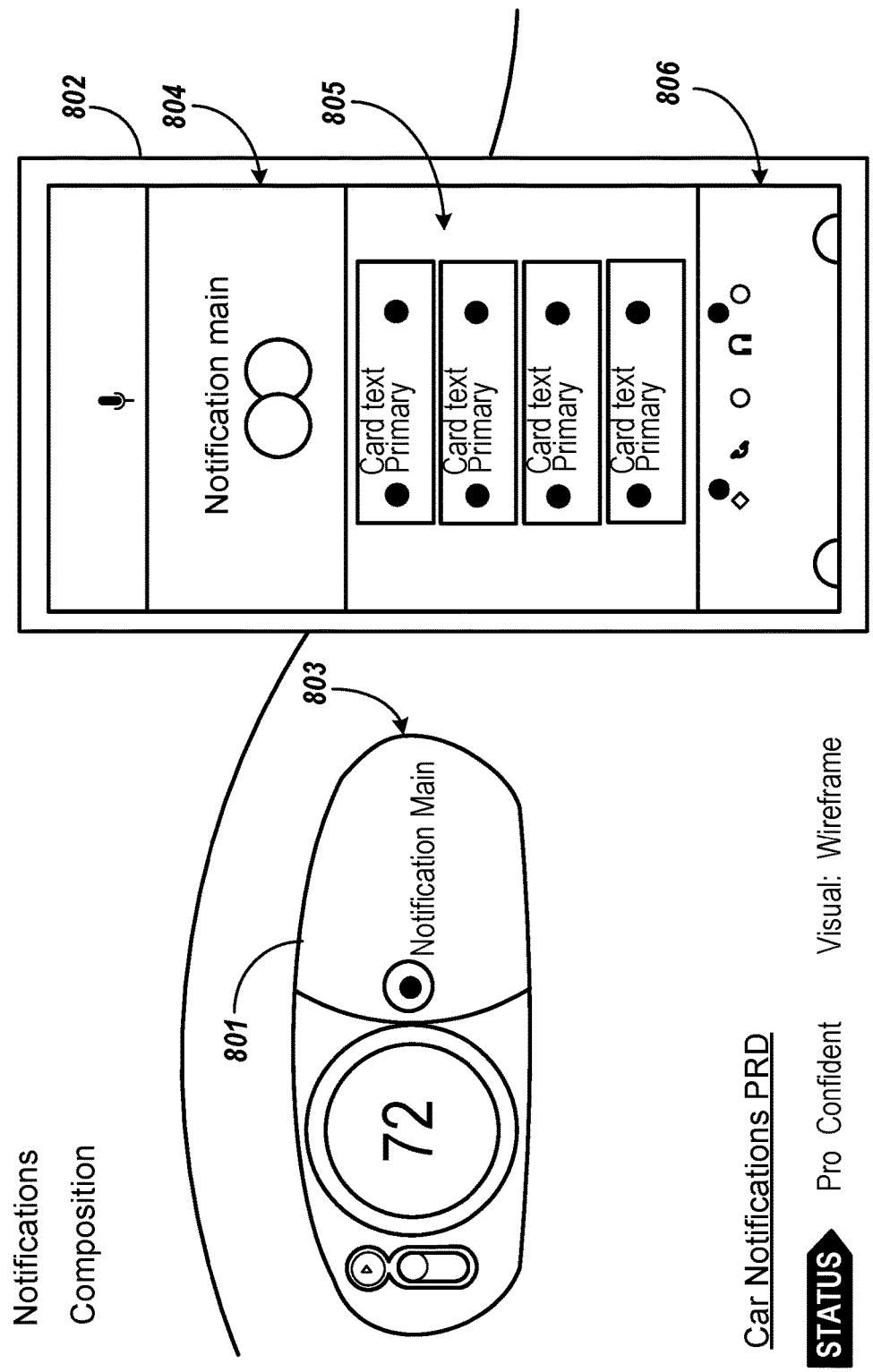
FIG. 8A is an example of a user interface that may be displayed using a vehicle display.

FIG. 8A is an example of a user interface that may be displayed using a vehicle display. In the example, a vehicle has at least two screens, including a first screen 801 on the instrument panel, and a second screen 802 on the center console. As shown, important notifications can be shown in a notification area 803 on the first screen 801, but the number of notifications may be limited to just one or two, and the rate that notifications change can be limited to avoid distracting the driver. The second screen 802 on the center console can present a larger number of messages, including messages that are less urgent. In addition to a notification area 804, the center console may display a "home screen" or message feed 805 where new messages can appear or disappear dynamically as the context of the vehicle changes. Other controls, for media playback, phone calls, navigation, and so on can also be displayed in display area 806. The vehicle's head unit can control the display of messages for all of the screens in the vehicle, determining for each one which messages should be provided, how they should be presented, and when and how long they should remain.

Figure 8B:
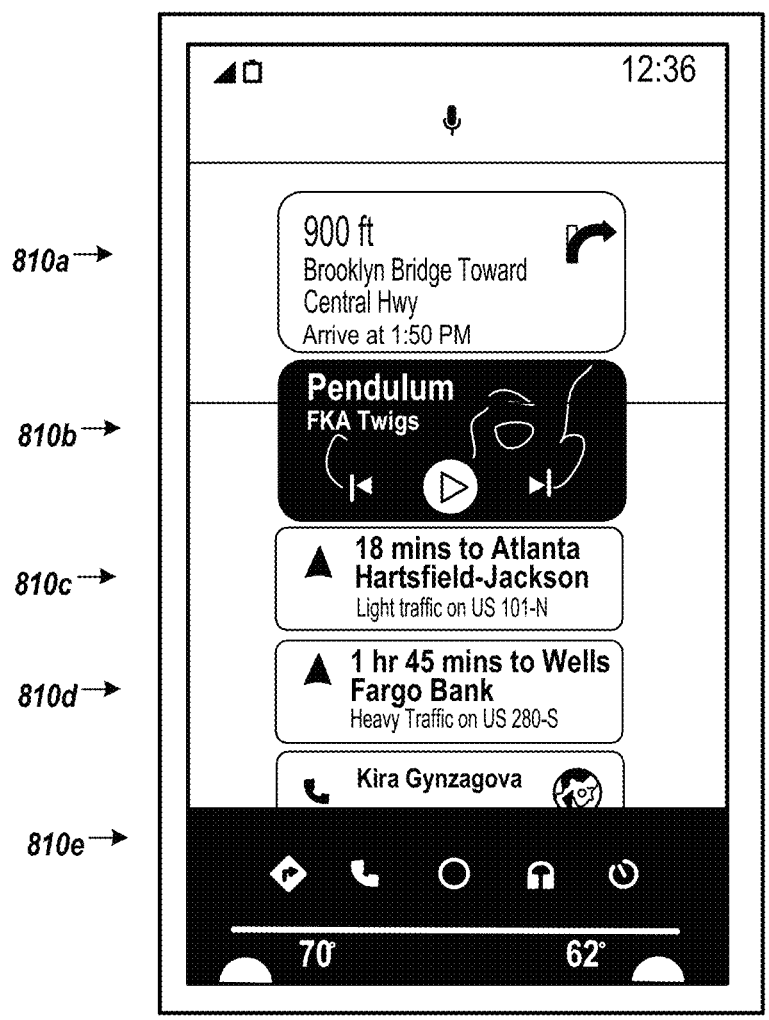
FIG. 8B is an example of another user interface that may be displayed using a vehicle display.

FIG. 8B is an example of another user interface that may be displayed using a vehicle display. In the example, the prioritization of messages 810a-810e can be seen. There are no critical messages about the state of the vehicle, like low tire pressure or low fuel. The vehicle is navigating to a destination, so the message 810a shows an upcoming turn that needs to be made. The head unit of the vehicle determines that this is the most relevant message for the user at the current time, based on the state of the car and the navigation task, and ranks the message 810a above the others. A second message 810b shows a currently playing song, representing a currently ongoing activity. Messages 810c, 810d show navigation information, such as landmarks, waypoints, and traffic conditions, which may be useful but are not immediately needed. As the vehicle travels and conditions change, the relevance and ranking of the messages may change. Some messages may be updated, e.g., to show the approach of the upcoming turn or the change of a song being played. Some messages may persist as long as they are relevant to the vehicle's context, while others may be removed automatically, for example, after 15 seconds, 30 seconds, or another predetermined time period. New messages may be inserted into the list, moved into position from the top or bottom of the message list, or be shown in another manner.

In some implementations, the messages 810a-810e can be ranked into groups along with other candidate messages that are not shown. While messages in a "critical" group may typically be shown at a top or highest-ranked position, there are no messages in that group in the example of FIG. 8B. The messages 810a-810d may all be within a second group of ongoing or current tasks. The highest-ranking messages in a third group, including message 810e may be shown below.

Figure 8C:
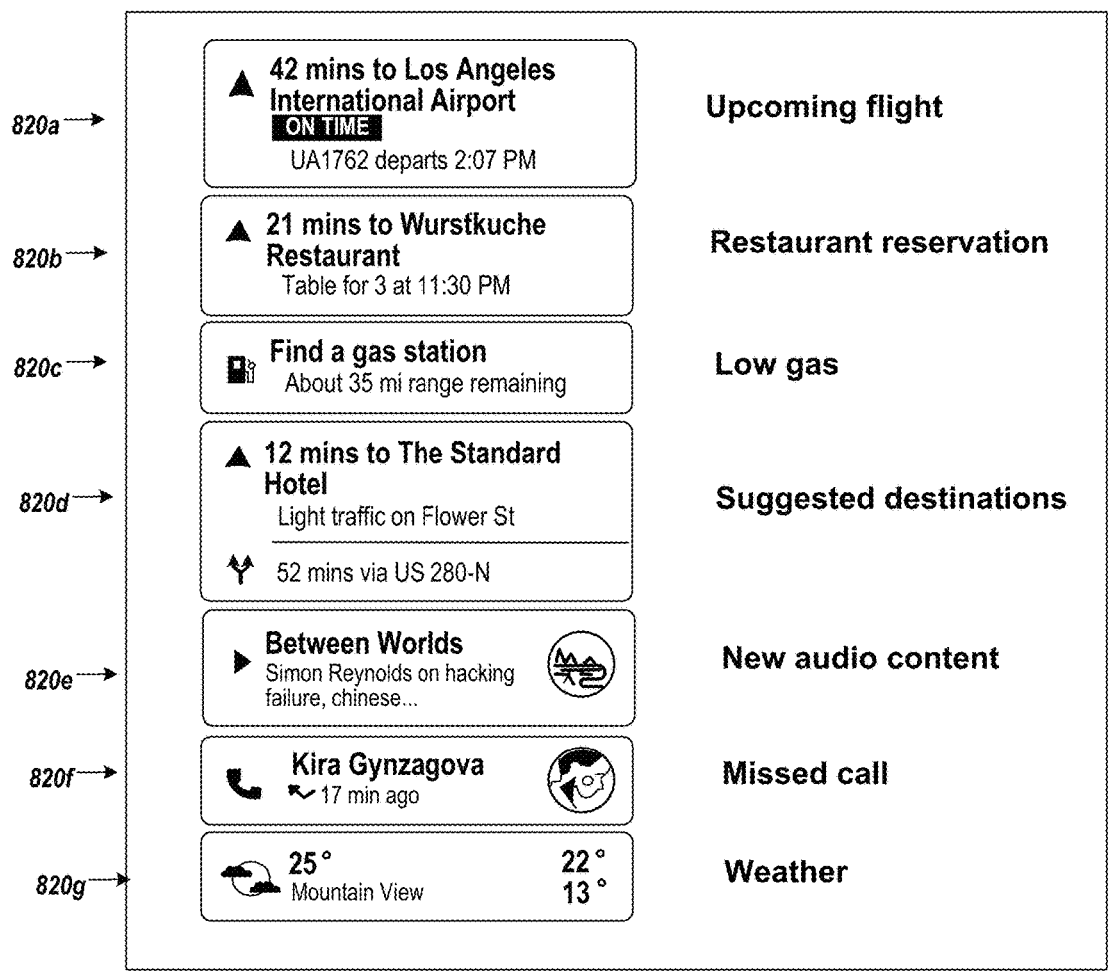
FIG. 8C is an example of another user interface that may be displayed using a vehicle display.

FIG. 8C is an example of another user interface that may be displayed using a vehicle display. The example of FIG. 8C shows various examples of different cards or messages 820a-820g that can be displayed. Message 820a indicates a user's upcoming flight. The vehicle's head unit can communicate with a user's phone or with a server system to access data from a user account. With information the user may have shared from an e-mail account or calendar functionality, the head unit or applications executing on the head unit can determine the flight is upcoming and provide the message 820a. The message 820b shows a time to reach a nearby reservation, prompted by information about a user's reservation at the restaurant. This could be determined to be relevant based on, for example, information about the reservation, a destination in the navigation system, a time of day, or other factors. The message 820c prompts the user to find a gas station, indicating that only about a 35-mile range is available with current fuel. This message 820c could be generated by, for example, an application that monitors vehicle information, which could be customized by the manufacturer of the vehicle.

The message 820d indicates a suggested destination, which may be provided as an alternative, a waypoint, or simply before the user has entered a destination. The message 820e shows that new audio content is available. Message 820e shows a record of a missed call, and message 820g shows current weather conditions.

Each of the messages 820a-820g can be interactive, allowing a user to tap, swipe, or otherwise interact to perform an action. For example, a user may tap the message 820e to initiate playback of the associated audio content. A user may tap the messages 820a-820d to initiate navigation to the associated locations, or to find out more about the locations. For example, interacting with message 820c can bring up a location of one or more nearby gas stations that the user can select for refueling. As another example, a user can select the message 820f to call the person whose call was misses, which would initiate a call with the user's phone but allow the user to participate in the call using a microphone and speakers of the vehicle.

Consider various use cases where the present technology can be used. For example, a user named Harris enters his car in the morning getting ready to go to work. On the overview screen in the center console a card is shown that there is a 50-minute slowdown on the 101 southbound. Harris taps the card and Google Maps recommends an alternative route using the 280.

As another example, a user named Victor is taking his car for a road trip to Los Angeles. The top is down and some jazz is playing from the sound system, he's not looking at any of the cars instruments like the fuel meter. A card is shown at the top of the overview notifying Victor the last gas station he can pull up into is in 2 miles before he runs out of gas.

As another example, a user named Andrews Junior is driving in the French countryside on a summer holiday. While pulling from a small road onto the freeway, the car sensors notice rapid dropping pressure in the left front tire. An alert card is shown on both the home screen and the instrument panel alerting AJ of the impeding safety risk. AJ is able to drive to safety and the card suggest to call 'Assistance Routière du France' to get help replacing his tire.

As another example, a user named Angela walks up to her car after a cold night. It's actually been freezing in San Francisco, which is unusual. As she gets into the car and turns the key a card is shown on the home screen: "Freezing conditions, Windscreen heaters enabled, cold weather driving dynamics enabled, have a safe trip."

Embodiments of the invention and all of the functional operations described in this specification may be implemented in digital electronic circuitry, or in computer software, firmware, or hardware, including the structures disclosed in this specification and their structural equivalents, or in combinations of one or more of them. Embodiments of the invention may be implemented as one or more computer program products, i.e., one or more modules of computer program instructions encoded on a computer-readable medium for execution by, or to control the operation of, data processing apparatus. The computer readable medium may be a non-transitory computer readable storage medium, a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments of the invention may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the invention may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the invention, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular embodiments of the invention have been described. Other embodiments are within the scope of the following claims. For example, the actions recited in the claims may be performed in a different order and still achieve desirable results.

What is claimed is:

1. A method comprising:
    receiving vehicle data indicating a state of a vehicle, wherein the vehicle data includes one or more of sensor data generated by one or more sensors of the vehicle, or application data generated by one or more vehicle applications, the sensor data being indicative of one or more physical parameters of the vehicle;
    determining, based on the vehicle data indicative of the state of the vehicle, a current vehicle context, the current vehicle context being one of a plurality of predetermined vehicle contexts;
    receiving message data indicating one or more candidate messages, each candidate message having a respective display context from a plurality of display contexts, wherein each of the plurality of display contexts matches at least one of the predetermined vehicle contexts;
    determining whether a particular message of the one or more candidate messages has a display context that matches the current vehicle context; and
    responsive to determining that the display context of the particular message matches the current vehicle context:
        determining, based on the current vehicle context, a particular vehicle display of a plurality of display devices of the vehicle on which to display the particular message, wherein each of the plurality of the display devices of the vehicle are mounted to the vehicle; and
        providing the particular message for output on the particular vehicle display and not one or more of the other vehicle display devices from the plurality of vehicle display devices.

2. The method of claim 1, wherein the particular message is a first message from the one or more candidate messages, the method further comprising:
    responsive to determining that a second message from the one or more candidate messages has a respective display context that does not match the current vehicle context, discarding the second message without providing the second message for display on one of the plurality of display devices of the vehicle.

3. The method of claim 1, wherein the one or more candidate messages comprises a plurality of candidate messages, the method further comprising:
    determining that two or more messages from the plurality of candidate messages have respective display contexts that match the current vehicle context;
    clustering the two or more messages into two or more respective groups based on (i) the respective display context associated with each of the two or more messages, or (ii) a respective application that generated each of the two or more messages; and
    assigning a priority value to each of the two or more messages based on the respective group into which each of the two or more messages is clustered.

4. The method of claim 3, further comprising:
    ranking each of the two or more messages based on the assigned priority value; and
    providing the two or more messages for output on the particular vehicle display based on the ranking.

5. The method of claim 1, further comprising:
    detecting user feedback associated with the particular message after the particular message was output on the particular vehicle display;
    determining whether the user feedback includes (i) positive interaction or (ii) negative interaction; and
    in response to determining that the user feedback includes positive interaction, increasing a quality score associated with the particular message.

6. The method of claim 5, further comprising:
    in response to determining that the user feedback includes negative interaction, decreasing the quality score associated with the particular message.

7. The method of claim 5, further comprising:
    determining the current vehicle context at the time the user feedback was received; and updating, based on the user feedback, the quality score for the particular message at the time the user feedback was received.

8. A system comprising:
one or more computers; and
one or more storage devices storing instructions that are operable, when executed by the one or more computers, to cause the one or more computers to perform operations comprising:
receiving vehicle data indicating a state of a vehicle, wherein the vehicle data includes one or more of sensor data generated by one or more sensors of the vehicle, or application data generated by one or more vehicle applications, the sensor data being indicative of one or more physical parameters of the vehicle;
determining, based on the vehicle data indicative of the state of the vehicle, a current vehicle context, the current vehicle context being one of a plurality of predetermined vehicle contexts;
receiving message data indicating one or more candidate messages, each candidate message having a respective display context from a plurality of display contexts, wherein each of the plurality of display contexts matches at least one of the predetermined vehicle contexts;
determining whether a particular message of the one or more candidate messages has a display context that matches the current vehicle context; and
responsive to determining that the display context of the particular message matches the current vehicle context:
determining, based on the current vehicle context, a particular vehicle display of a plurality of display devices of the vehicle on which to display the particular message, wherein each of the plurality of the display devices of the vehicle are mounted to the vehicle; and
providing the particular message for output on the particular vehicle display and not one or more of the other vehicle display devices from the plurality of vehicle display devices.

9. The system of claim 8, wherein the particular message is a first message from the one or more candidate messages, the operations further comprising:
responsive to determining that a second message from the one or more candidate messages has a respective display context that does not match the current vehicle context, discarding the second message without providing the second message for display on one of the plurality of display devices of the vehicle.

10. The system of claim 8, wherein the one or more candidate messages comprises a plurality of candidate messages, the operations further comprising:
determining that two or more messages from the plurality of candidate messages have respective display contexts that match the current vehicle context;
clustering the two or more messages into two or more respective groups based on (i) the respective display context associated with each of the two or more messages, or (ii) a respective application that generated each of the two or more messages; and
assigning a priority value to each of the two or more messages based on the respective group into which each of the two or more messages is clustered.

11. The system of claim 8, the operations further comprising:
detecting user feedback associated with the particular message after the particular message was output on the particular vehicle display;
determining whether the user feedback includes (i) positive interaction or (ii) negative interaction; and
in response to determining that the user feedback includes positive interaction, increasing a quality score associated with the particular message.

12. The system of claim 11, the operations further comprising:
in response to determining that the user feedback includes negative interaction, decreasing the quality score associated with the particular message.

13. The system of claim 11, the operations further comprising:
determining the current vehicle context at the time the user feedback was received; and
updating, based on the user feedback, the quality score for the particular message at the time the user feedback was received.

14. A non-transitory computer-readable medium storing software comprising instructions executable by one or more computers which, upon such execution, cause the one or more computers to perform operations comprising:
receiving vehicle data indicating a state of a vehicle, wherein the vehicle data includes one or more of sensor data generated by one or more sensors of the vehicle, or application data generated by one or more vehicle applications, the sensor data being indicative of one or more physical parameters of the vehicle;
determining, based on the vehicle data indicative of the state of the vehicle, a current vehicle context, the current vehicle context being one of a plurality of predetermined vehicle contexts;
receiving message data indicating one or more candidate messages, each candidate message having a respective display context from a plurality of display contexts, wherein each of the plurality of display contexts matches at least one of the predetermined vehicle contexts;
determining whether a particular message of the one or more candidate messages has a display context that matches the current vehicle context; and
responsive to determining that the display context of the particular message matches the current vehicle context:
determining, based on the current vehicle context, a particular vehicle display of a plurality of display devices of the vehicle on which to display the particular message, wherein each of the plurality of the display devices of the vehicle are mounted to the vehicle; and
providing the particular message for output on the particular vehicle display and not one or more of the other vehicle display devices from the plurality of vehicle display devices.

15. The computer-readable medium of claim 14, wherein the particular message is a first message from the one or more candidate messages, the operations further comprising:
responsive to determining that a second message from the one or more candidate messages has a respective display context that does not match the current vehicle context, discarding the second message without providing the second message for display on one of the plurality of display devices of the vehicle.

16. The computer-readable medium of claim 14, wherein the one or more candidate messages comprises a plurality of candidate messages, the operations further comprising:

determining that two or more messages from the plurality of candidate messages have respective display contexts that match the current vehicle context;

clustering the two or more messages into two or more respective groups based on (i) the respective display context associated with each of the two or more messages, or (ii) a respective application that generated each of the two or more messages; and assigning a priority value to each of the two or more messages based on the respective group into which each of the two or more messages is clustered.

17. The computer-readable medium of claim 16, the operations further comprising:

ranking each of the two or more messages based on the assigned priority value; and providing the two or more messages for output on the particular vehicle display based on the ranking.

18. The computer-readable medium of claim 14, the operations further comprising:

detecting user feedback associated with the particular message after the particular message was output on the particular vehicle display;

determining whether the user feedback includes (i) positive interaction or (ii) negative interaction; and in response to determining that the user feedback includes positive interaction, increasing a quality score associated with the particular message.

19. The computer-readable medium of claim 18, the operations further comprising:

in response to determining that the user feedback includes negative interaction, decreasing the quality score associated with the particular message.

20. The computer-readable medium of claim 18, the operations further comprising:

determining the current vehicle context at the time the user feedback was received; and updating, based on the user feedback, the quality score for the particular message at the time the user feedback was received.

* * * * *